(12) United States Patent
Nolan

(10) Patent No.: US 6,307,991 B1
(45) Date of Patent: Oct. 23, 2001

(54) OPTICAL FILTER WITH HARMONIC ELEMENTS

(75) Inventor: Daniel A. Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/362,758

(22) Filed: Jul. 28, 1999

(51) Int. Cl.⁷ ................................................ G02B 6/26
(52) U.S. Cl. ................................................ 385/50
(58) Field of Search ................................. 385/31, 32, 46, 385/50

(56) References Cited

U.S. PATENT DOCUMENTS

| | | | |
|---|---|---|---|
| 5,926,298 | 7/1999 | Li | 359/120 |
| 5,930,441 | * 7/1999 | Betts et al. | 385/140 |
| 6,094,513 | 7/2000 | Rigny et al. | 385/24 |
| 6,137,939 | * 10/2000 | Henry et al. | 385/132 |
| 6,141,467 | * 10/2000 | Doerr | 385/24 |
| 6,144,783 | * 11/2000 | Epworth et al. | 385/24 |

FOREIGN PATENT DOCUMENTS 0 724 173 A1   7/1996   (EP).

OTHER PUBLICATIONS

K. Okamoto et al., "Arrayed–Waveguide Grating Multiplexer With Flat Spectral Response", Optics Letters vol. 20, No. 1, Jan. 1. 1995, pp. 43–45.

"Synthesis of Coherent Two–port Lattice–form Optical Delay–line Circuit", K. Jinguji and M. Kawachi, Journal of Lightwave Technology, vol. 13, No. 1, Jan. 1995, pp. 73–78.

* cited by examiner

*Primary Examiner*—Akm E. Ullah
(74) *Attorney, Agent, or Firm*—Juliana Agon; William Greener; Thomas Ryan

(57) ABSTRACT

Optical interference filters are designed with harmonic elements that can be related to Fourier series approximations of desired filter responses. The harmonic elements can be fashioned as individual waveguides of an array arranged in various formats including planar or concentric geometries. The expansion coefficients of the Fourier series correspond to normalized power distributions among the waveguides, and the harmonic components of the series correspond to incremental optical path length differences between the waveguides.

22 Claims, 3 Drawing Sheets

OPTICAL FILTER WITH HARMONIC ELEMENTS

FIELD OF THE INVENTION

The invention relates generally to the field of optical communications, and more particularly to devices and methods employing optical interference phenomena for differentially attenuating selected wavelengths of light to provide filtering for, e.g., gain flattening, as well as dispersion compensation and for other wavelength management purposes.

BACKGROUND

Interference filters rely on constructive and destructive interference to provide and shape filter responses. The interference is created by overlapping different phase-shifted portions of the same beam. The beam divisions are generally overlapping portions separated only by time (i.e., phase delay). However, the beams can also be divided spatially into transverse sections subject to different phase delays, which must be recombined to produce the required overlap.

Examples of interference filters with temporally separated beam portions include dielectric filters, Fabry-Perot etalons, Bragg gratings, long period gratings, and micro-optic devices. Most of these filters, particularly Fabry-Perot etalons and long period gratings, have limited response profiles and must be concatenated to produce more complex response profiles. For example, simple response profiles, such as Gaussian profiles, can be combined by conventional curve fitting techniques to approximate the desired response profiles, however, the multiple filter components can be cumbersome to assemble and are subject to both fabrication and assembly errors.

Co-assigned U.S. Pat. No. 5,841,583 to Bhagavatula entitled "Multi-path Interference Filter" discloses examples of interference filters with spatially separated beam portions. Complex response profiles can be supported by the multi-path filters, but fitting the filters' performances to desired response profiles is more difficult.

SUMMARY OF THE INVENTION

The present invention is directed to optical interference filters and filtering methods. It promotes a simplified design of optical interference filters for approximating a wide range of spectral responses. The filters include a series of harmonically related elements that can be combined to produce more complex periodic spectral responses. The harmonically related elements correspond to beam divisions distinguished by phase angles and optical power.

Many desired spectral response functions can be approximated by a series of harmonic functions (such as a Fourier series), and such a representation can be directly related to the physical design of an interference filter. According to an embodiment of the invention, the filter divides a beam of light into beam portions that traverse different optical paths lengths and that subsequently interfere with each other. Optical energy of the beam is apportioned between the beam portions in accordance with relative magnitudes of the series of harmonic functions, and the different optical path lengths are equated to periods of the harmonic functions.

In a preferred aspect of the invention, the filter has an array format composed of a series of individual waveguides, but other formats for dividing beams either spatially or temporally can also be directly related to such harmonic series. A Fourier series analysis of the desired response function, for example, can be converted directly into the physical characteristics of the filter array required to achieve the Fourier series approximation. The coefficients of the Fourier series convert directly into divisions of optical power among the waveguides, which can be accomplished by adjusting the position or the relative size of the waveguides in the beam field. The phase angle terms of the Fourier series representing integer multiples of a fundamental frequency convert directly into relative differences in the optical path lengths of the waveguides, which can be accomplished by adjusting the physical path lengths or the propagation constants of the waveguides.

In another embodiment, an interference filtering system provides a desired spectral response through beam division and apportionment and subsequent selective interference.

A further embodiment describes a phased-array interference filter for modifying the spectral characteristics of a multi-wavelength light beam, and includes a waveguide array having a plurality of optical waveguides with different optical path lengths, at least one optical coupler connecting the waveguide array to input and output waveguides wherein the waveguides of the array are sized and positioned in relation to each other for conveying unequal portions of the total optical power of the beam, and further wherein the waveguides of the array have optical path lengths that differ from one another by a multiple of a given optical path length difference.

Another embodiment of the invention describes a method of designing an optical interference filter to approximate a desired spectral response. An aspect of this embodiment involves representing the desired spectral response by a series of harmonic functions, converting magnitudes of the harmonic functions into apportionments of power among optical pathways through the filter, and converting periods of the harmonic functions into optical path length differences among the optical pathways.

DETAILED DESCRIPTION OF A PREFERRED EMBODIMENT

Figure 1:
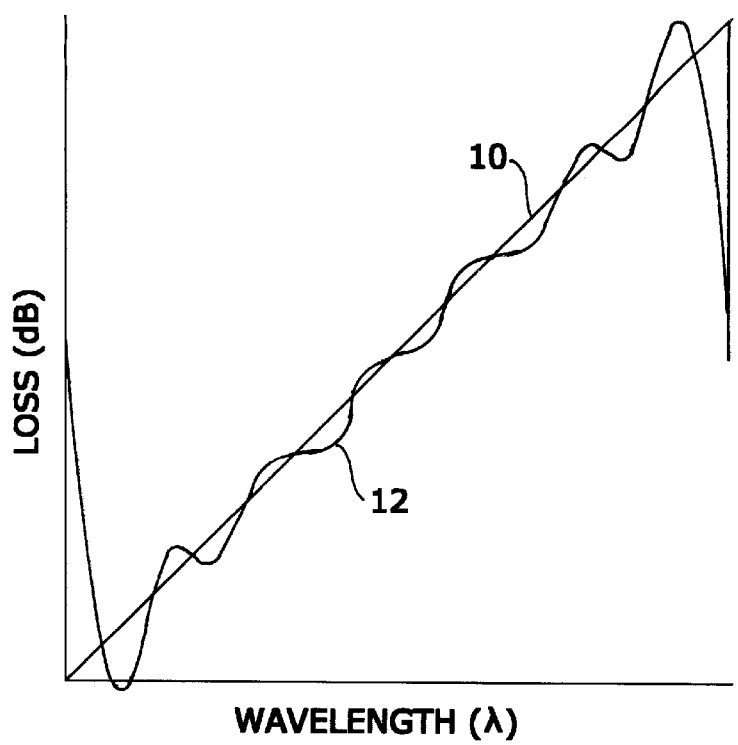
FIG. 1 is a graph comparing a Fourier series approximation to a desired spectral response.

FIG. 1 shows a desired spectral response curve 1. This curve is approximated by a plot 12 of a Fourier series, which can take the following form:

$$F(\lambda) = a_0 + \sum_{k=1}^{\infty} a_k \exp[jk\omega\lambda]$$

where "$F(\lambda)$" is a function of beam power attenuation over a domain of wavelengths "$\lambda$", "$a_0$ and $a_k$" are the Fourier expansion coefficients, "$j$" is an imaginary number "$\sqrt{-1}$", "k" is an integer that distinguishes the series terms, and "ω" is equal to an expression 2π/T with "T" as the overall period of the function. The curve 12 covers one entire period.

Figure 2:
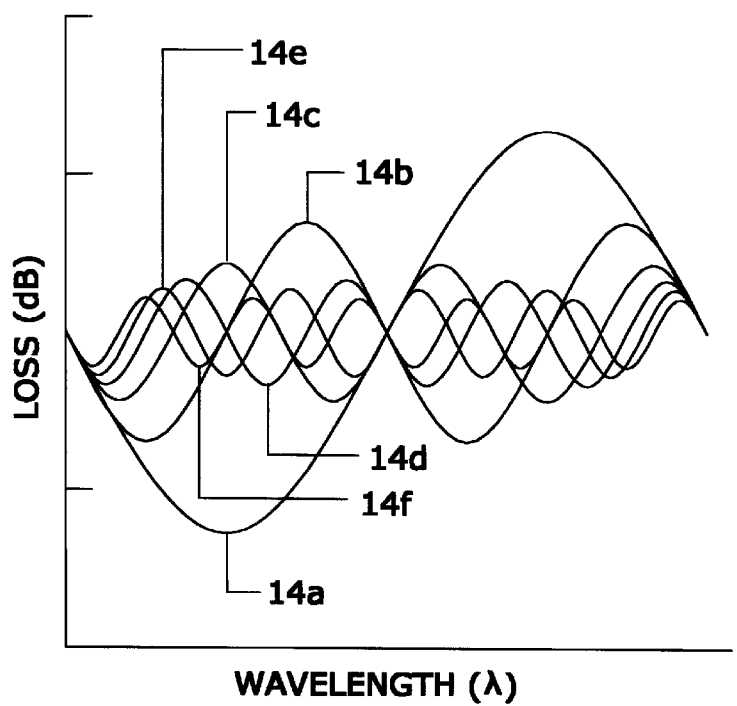
FIG. 2 is a graph illustrating the harmonic content of the Fourier series approximation.

FIG. 2 shows a series of curves 14a–14f which depict the harmonic content of the Fourier series approximation 12 of FIG. 1. Each of the series terms contributes a simple harmonic function plotted as individual curves 14a–14f, which combine to produce the series approximation 12. Those of skill in this art are well aware of the curve-fitting possibilities of such Fourier series and can readily fit them where appropriate to many other spectral response curves (e.g., those satisfying Dirichlet conditions).

I have found a remarkable correspondence between such Fourier series representations of spectral response curves and the physical attributes of interference filters. The correspondence can be readily demonstrated with reference to FIG. 3 by a new planar filter array 20. The filter array 20 is symmetric with respect to a vertical line (not shown) centered between components 26 and 28, and includes an input waveguide 22, an output waveguide 24, and two end-by-end optical couplers 26 and 28 connecting the input and output waveguides 22 and 24 to opposite ends of array waveguides 30. Phase adjusting regions 32 and 36 of the array waveguides 30 compensate for any inadvertent phase shifting between the array waveguides 30 caused by the couplings 26 and 28, and a phase shifting region 34 of the array waveguides 30 provides intentional phase shifting between the waveguides 30 in accordance with a predetermined multiple of an optical path length difference. Such a filter 20 can be manufactured similar to conventional phased arrays used for purposes of multiplexing and demultiplexing.

A field "$F_{out}$" exiting the filter array 20 can be described by a product of four matrices "M1, M2, M3, M4". The matrix "M1" describes an input field, the matrix "M2" describes a field exiting the coupler 26 and the first phase adjusting region 32, the matrix "M3" describes a field exiting a phase shifting region 34 and a second phase adjusting region 36, and matrix "M4" describes a field exiting the coupler 28. The matrices are expressed as follows:

$$M1 = \begin{vmatrix} 1 \\ 0 \\ 0 \\ 0 \\ 0 \end{vmatrix}$$

$$M2 = \begin{vmatrix} 0 & j\sqrt{\alpha_0} & j\sqrt{\alpha_1} & j\sqrt{\alpha_2} & j\sqrt{\alpha_n} \\ j\sqrt{\alpha_0} & & & & \\ & & & & \\ j\sqrt{\alpha_n} & & & & 0 \end{vmatrix}$$

$$M3 = \begin{vmatrix} 0 & \exp[j\Phi_0] & 0 & 0 & 0 \\ & & \exp[j\Phi_1] & & \\ & & & \exp[j\Phi_2] & \\ & & & & \\ & & & & \exp[j\Phi_n] \end{vmatrix}$$

where "$\Phi_m$" is equal to the expression "$\phi_0 + m\, j\, \beta\, \Delta z$"; and

M4=M2

$F_{out}$=M4×M3×M2×M1

Only the first element of this matrix multiplication is non-zero. The expanded expression is given by:

$F_{out}$=−α₀exp[jφ₀]−α₁exp[jφ₀+jβΔZ]−β₂exp[jφ₀+2jβΔZ] . . . −β$_n$exp[jφ₀+njβΔZ]

Setting the term "$\phi_0$" equal to zero, which corresponds to an arbitrary phase shift across all of the waveguides of the array 30, the expression for "$F_{out}$" can be rewritten as follows:

$$F_{out} = \alpha_0 + \sum_{m=1}^{n} \alpha_m \exp[mj\beta\Delta z]$$

The simplified expression for "$F_{out}$" clearly matches the form of a Fourier series expression such as written above for the spectral response function "F(λ)". The Fourier expansion coefficients "$\alpha_0$ and $\alpha_m$", which replace the coefficients "$a_0$ and $a_k$", correspond to normalized amounts of optical power conveyed by each of the array waveguides 30, which are numbered from "m=0" to "m=n". The size of the matrices is set equal to the integer "n", which also corresponds to the total number of array waveguides 30. The integer "m", which replaces the integer "k", distinguishes the series terms as well as the array waveguides 30. Although only a limited number "n" of array waveguides 30 is depicted in FIG. 3, a symmetric distribution of array waveguides 30 is preferably provided on an opposite side of a longitudinal axis 39, and more or less waveguides "n" can be used where appropriate to approximate the desired filter function.

The expression "β Δz" replaces the expression "ωλ". "β" corresponds to the propagation constant of the array waveguides 30, and "Δz" corresponds to an incremental difference in physical path length between adjacent waveguides of the array 30. Together, the expression "β Δz" dictates the optical path distance modification between the waveguides.

The normalized power of each waveguide given by the expansion coefficients "$\alpha_0$–$\alpha_n$" can be controlled by adjusting an opening size "$S_m$" of each waveguide corresponding to a percentage of the transmitted beam field or by adjusting the position of each waveguide within the beam field, assuming the field has a variable intensity profile. The optical path distance modification "β Δz" is preferably carried out by adjusting the physical path length difference "Δz" between the array waveguides. However, the propagation constant "β" could also be varied to produce similar results, such as by incrementally varying the waveguide widths "$W_m$" or their refractive index.

Figure 3:
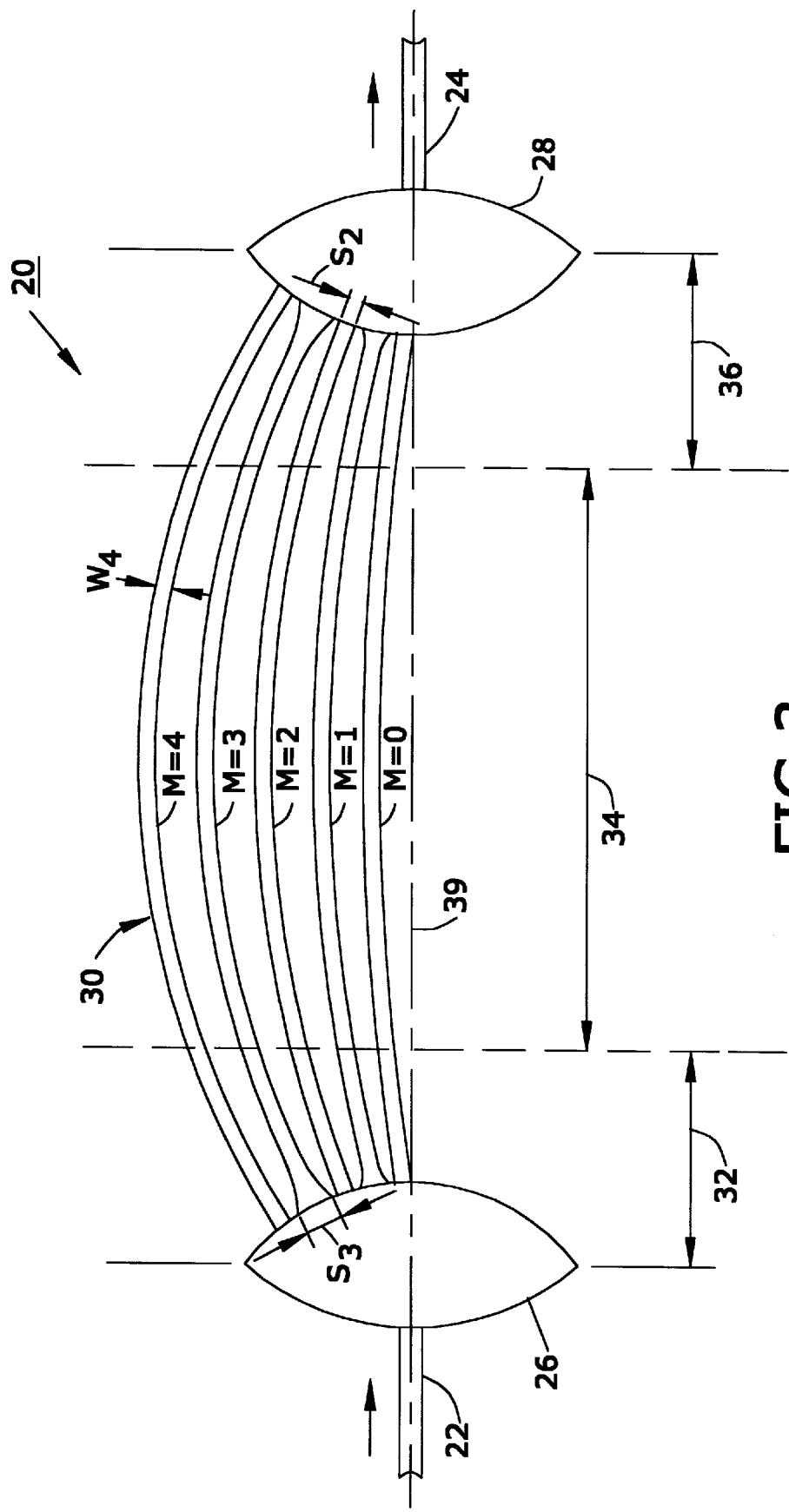
FIG. 3 is a schematic representation of a planar array filter according to an embodiment of the invention having physical characteristics that can be directly related to terms of a Fourier series approximating a desired spectral response.
Figure 4:
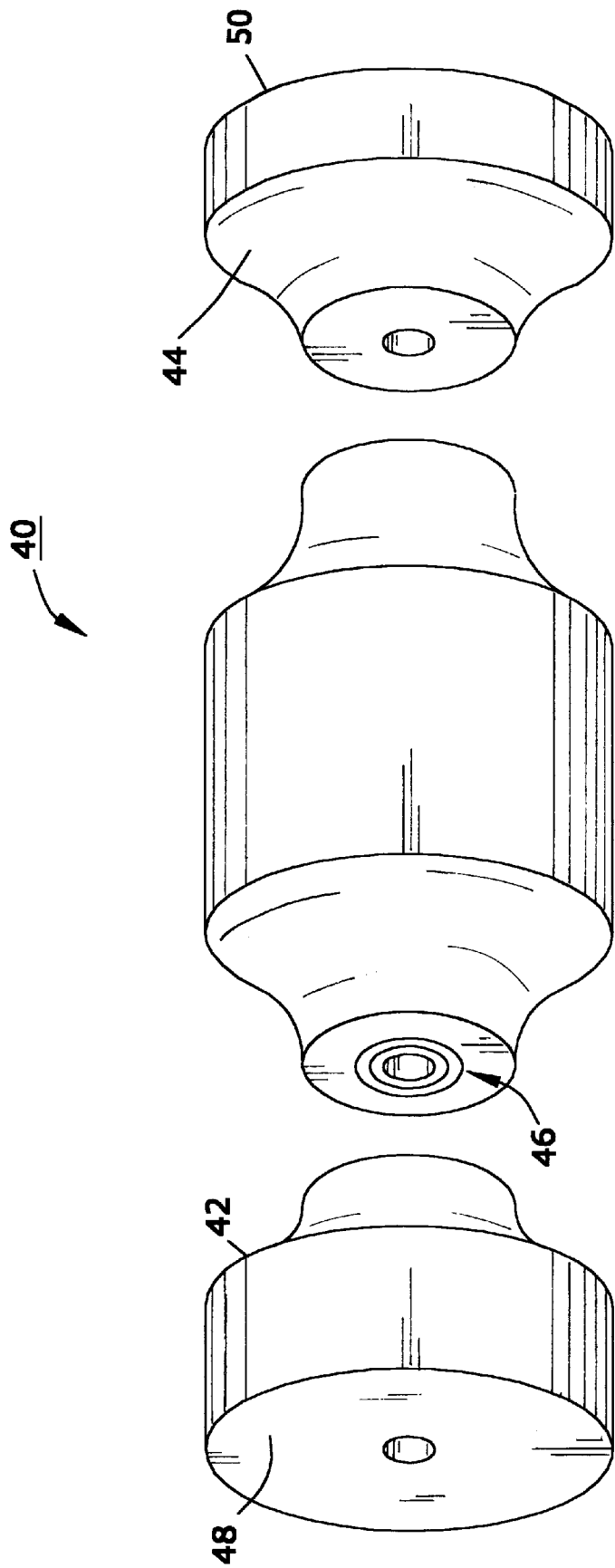
FIG. 4 is a schematic representation of a coaxial filter according to another embodiment of the invention similarly related to a Fourier series approximation.

Instead of arranging the harmonic components of my new filter in a planar array as shown in FIG. 3, a similarly performing filter can be formed with corresponding harmonic components arranged in a co-axial filter array 40 as shown in FIG. 4. Tapered input and output couplers 42 and 44 connect an array of co-axial waveguide rings 46 to the ends of single mode fibers 48 and 50. The number of waveguide rings 46, the normalized power in each of the rings "$\alpha_0$–$\alpha_n$", and the optical path length modification between rings "β Δz" are all dictated by the Fourier series "$F_{out}$", whose terms are equated to the Fourier series "F(λ)" approximating a desired spectral response for the coaxial filter array 40.

Many other interference filter designs can benefit from this invention regardless of whether the filtered signal is separated spatially or temporally along optical pathways distinguished by incremental optical path length differences. However, the filters must permit control over the division of power among the different pathways to satisfy the Fourier expansion coefficients. Several more examples of such filters are disclosed in U.S. Pat. No. 5,841,583 to Bhagavatula, the disclosure of which is hereby incorporated by reference. These include examples in which different portions of a collimated beam are interrupted by optical path length modifiers (such as axially offset reflectors or spacers with different refractive indices). The relative size and positioning of the modifiers can be adjusted to control the division of power among the different beam portions. Another example includes a stack of partially reflective surfaces. Layer widths and refractive index differences can be adjusted to control both the optical path length variation between layers and the relative amounts of power reflected by each layer.

The phase delay characteristics of these filters also support their use for performing dispersion compensation. A desired spectral response (i.e., transfer function) can be specified for purposes of dispersion compensation. An example is given in a paper by Takeshi Ozeki entitled "Optical equalizers", published in Optics Letters, Mar. 1, 1992, Vol. 17, No. 5, which is hereby incorporated by reference. A Fourier series approximation can be made of the suggested transfer function and related as explained above to the physical characteristics of the filter.

Although the invention has been described in detail for the purpose of illustration, it is understood that such detail is solely for that purpose, and variations can be made therein by those skilled in the art without departing from the spirit and scope of the invention that is defined by the following claims.

I claim:

1. A phased-array interference filter for relatively attenuating selected spectral portions of a beam of light comprising:
    a single optical input and a single optical output joined by a plurality of individual optical pathways formed in a common planar optical waveguide;
    said optical pathways within the planar optical waveguide being arranged for conveying unequal portions of the beam's power;
    said optical pathways having unequal optical path lengths differing from one another as multiples of a common number for relatively shifting phases of the unequal beam portions;
    an input optical coupler that connects the single input to the plurality of pathways in the planar optical waveguide for dividing the beam into the unequal beam portions; and
    an output optical coupler that connects the plurality of pathways in the planar optical waveguide to the single output for recombining the phase-shifted beam portions to attenuate selected spectral portions of the beam by interference.

2. The filter of claim 1 in which a spectral response of the filter is represented by a Fourier series having a form of:

$$F_{out} = \alpha_0 + \sum_{m=1}^{n} \alpha_m \exp[mj\beta\Delta z]$$

where "$F_{out}$" is the spectral response of the filter, "$\alpha_0$" and "$\alpha_m$" are the Fourier coefficients corresponding to the relative amounts of power in each of the "m" numbered optical pathways, "j" is an imaginary number, and "$\beta \Delta z$" is an incremental difference in optical path length between the optical pathways.

3. The filter of claim 2 which "$\beta$" is a propagation constant, and "$\Delta z$" is an incremental difference in the physical path lengths of the optical pathways.

4. The filter of claim 1 in which said individual waveguides have different physical path lengths that are related as multiples of a common number.

5. The filter of claim 1 in which said individual waveguides have different propagation constants related as multiples of a common number.

6. The filter of claim 1 in which said optical pathways are relatively sized and positioned to convey the different portions of the beam's power.

7. A coaxial interference filtering system that divides a beam of light into concentric beam portions that transverse different optical path lengths and recombines the concentric beam portions to interfere with each other to approximate a predetermined spectral response in which (a) single input and output optical pathways are coupled to opposite ends of a coaxial array of waveguide rings that are arranged for apportioning optical energy between the beam portions in accordance with relative magnitudes of a series of harmonic functions and (b) the waveguide rings have different optical path lengths equated to periods of the harmonic functions.

8. The system of claim 7 in which the series of harmonic functions are terms of a Fourier series.

9. The system of claim 8 in which the optical energy of the beam is apportioned between the beam portions traversing different optical path lengths in accordance with coefficients of the Fourier series.

10. The system of claim 9 in which the optical energy of the beam is apportioned by respective areas of optical pathways having the different optical path lengths.

11. The system of claim 9 in which the optical energy of the beam is apportioned by relative positions of optical pathway ends exposed to the beam.

12. The system of claim 9 in which the different optical path lengths are equated to the periods of the Fourier series.

13. The system of claim 12 in which the different optical path lengths include pathways with different physical length pathways.

14. The system of claim 12 in which the different optical path lengths include pathways with different propagation constants.

15. A method of designing an optical interference filter to approximate a predetermined spectral response comprising the steps of:
    representing the predetermined spectral response with a Fourier series of harmonic functions having a form of:

$$F_{out} = \alpha_0 + \sum_{m=1}^{n} \alpha_m \exp[mj\beta\Delta z]$$

where "$F_{out}$" is the spectral response of the filter, "$\alpha_0$" and "$\alpha_m$" are the Fourier coefficients corresponding to the magnitudes of each of "m" numbered harmonic functions, "j" is an imaginary number, and "$\beta \Delta z$" is a period of the harmonic functions;
    converting the magnitudes "$\alpha_0$" and "$\alpha_m$" of the harmonic functions into relative amounts of power in each of "m" numbered optical pathways through the filter; and
    converting the periods "$\beta \Delta z$" of the harmonic functions into an incremental difference in optical path length between the optical pathways for producing a filter with a spectral response that at least approximates the predetermined spectral response.

16. The method of claim 15 in which said step of converting magnitudes includes adjusting relative positions of the optical pathways within a field of the beam.

17. The method of claim 15 in which said step of converting magnitudes includes adjusting relative areas of the optical pathways within a field of the beam.

18. The method of claim 15 in which said step of converting periods includes adjusting relative physical path lengths of the optical pathways.

19. The method of claim 15 in which said step of converting periods includes adjusting relative propagation constants of the optical pathways.

20. A phased-array interference filter for modifying spectral characteristics of a multi-wavelength beam of light comprising:

a waveguide array including a plurality of individual optical waveguides formed in a common planar waveguide having different optical path lengths;

at least one optical coupler connecting the waveguide array between a single input waveguide and a single output waveguide;

the waveguides of the array being sized and positioned in relation to each other for conveying unequal portions of a total optical power of the beam;

the waveguides of the array having optical path lengths that differ from one another by a multiple of a given optical path length difference; and the at least one optical coupler recombines the unequal beam portions at the single output waveguide to attenuate selected spectral portions of the multi-wavelength beam by interference.

21. The filter of claim 20 in which the waveguides convey portions of the optical power corresponding to coefficients of a Fourier series approximating a predetermined spectral response for the filter.

22. The filter of claim 21 in which the given optical path length difference corresponds to a harmonic component of the Fourier series.

* * * * *